(12) United States Patent
Wegener et al.

(10) Patent No.: US 12,341,201 B2
(45) Date of Patent: Jun. 24, 2025

(54) FUEL CELL OR ELECTROLYSER

(71) Applicant: Schaeffler Technologies AG & Co. KG

(72) Inventors: Moritz Wegener, Erlangen (DE); Yashar Musayev, Nuremberg (DE); Jeevanthi Vivekananthan, Herzogenaurach (DE); Detlev Repenning, Reinbeck (DE); Ladislaus Dobrenizki, Hochstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 510 days.

(21) Appl. No.: 17/416,663

(22) PCT Filed: Dec. 12, 2019

(86) PCT No.: PCT/DE2019/101077
§ 371 (c)(1),
(2) Date: Jun. 21, 2021

(87) PCT Pub. No.: WO2020/125861
PCT Pub. Date: Jun. 25, 2020

(65) Prior Publication Data
US 2022/0045335 A1 Feb. 10, 2022

(30) Foreign Application Priority Data

Dec. 19, 2018 (DE) .......................... 102018132772.2
Dec. 11, 2019 (DE) .......................... 102019133872.7

(51) Int. Cl.
*H01M 4/88* (2006.01)
*B01J 35/33* (2024.01)
(Continued)

(52) U.S. Cl.
CPC .......... *H01M 4/9033* (2013.01); *B01J 35/33* (2024.01); *H01M 4/5825* (2013.01);
(Continued)

(58) Field of Classification Search
CPC .... H01M 8/18; H01M 4/9075; H01M 4/5825; H01M 4/8871; H01M 2008/1095
See application file for complete search history.

(56) References Cited

U.S. PATENT DOCUMENTS

| 2004/0265587 | A1* | 12/2004 | Koyanagi | ............. B82Y 30/00 |
| | | | | 428/398 |
| 2006/0263675 | A1* | 11/2006 | Adzic | .................... H01M 4/92 |
| | | | | 252/514 |

(Continued)

FOREIGN PATENT DOCUMENTS

| DE | 102015101249 A1 | 7/2016 |
| JP | 2004185990 A | 7/2004 |

(Continued)

OTHER PUBLICATIONS

See Corresponding Search Report for International Application PCT/DE2019/101077.

(Continued)

*Primary Examiner* — Jeremiah R Smith
(74) *Attorney, Agent, or Firm* — Davidson Kappel LLC

(57) ABSTRACT

A fuel cell or an electrolyser includes at least one electrode and at least one polymer electrolyte membrane. The electrode includes a catalyst system comprising a carrier metal oxide and a catalyst material. The catalyst material is formed by an electrically conductive metal phosphate in the form of a metaphosphate of the general chemical formula $Me^z_{n+2}(P_nO_{3n+1})_z$, where Me=metal, z=valency of the metal Me, and n is within the range of 1 to 10.

3 Claims, 3 Drawing Sheets

(51) Int. Cl.
*H01M 4/58* (2010.01)
*H01M 4/90* (2006.01)
*H01M 4/92* (2006.01)
*H01M 8/1213* (2016.01)
*H01M 8/10* (2016.01)

(52) U.S. Cl.
CPC ....... *H01M 4/8871* (2013.01); *H01M 4/9075* (2013.01); *H01M 4/926* (2013.01); *H01M 8/1213* (2013.01); *H01M 2008/1095* (2013.01)

(56) References Cited

U.S. PATENT DOCUMENTS

| | | | | |
|---|---|---|---|---|
| 2007/0037696 | A1* | 2/2007 | Gorer | H01M 4/926 502/224 |
| 2008/0312070 | A1* | 12/2008 | Talbot | B01J 23/002 502/343 |
| 2008/0318106 | A1* | 12/2008 | Kwak | B82Y 30/00 502/223 |
| 2010/0047642 | A1* | 2/2010 | Koji | H01M 8/04761 429/456 |
| 2011/0311904 | A1* | 12/2011 | Merzougui | H01M 4/9041 502/174 |
| 2012/0053045 | A1* | 3/2012 | Sato | H01M 4/9025 502/328 |
| 2012/0077672 | A1* | 3/2012 | Chu | H01M 4/925 977/773 |
| 2016/0172700 | A1* | 6/2016 | Enayetullah | H01M 8/1007 156/306.6 |
| 2016/0204442 | A1* | 7/2016 | Dale | H01M 4/925 429/528 |
| 2017/0033369 | A1* | 2/2017 | Burton | H01M 4/928 |
| 2017/0069915 | A1* | 3/2017 | Kas | D01D 5/003 |
| 2017/0084927 | A1* | 3/2017 | Banham | H01M 4/8807 |
| 2017/0233879 | A1* | 8/2017 | Kumta | C25B 9/73 502/226 |
| 2017/0244109 | A1* | 8/2017 | O'Malley | C25B 9/73 |
| 2019/0229345 | A1* | 7/2019 | Senoo | H01M 4/8807 |

FOREIGN PATENT DOCUMENTS

| | | | | |
|---|---|---|---|---|
| JP | 2005334685 A | * | 12/2005 | B01J 23/42 |
| JP | 2006-210135 A | | 8/2006 | |
| JP | 2010-108914 A | | 5/2010 | |
| JP | 2012104244 A | | 5/2012 | |
| JP | 2013-524442 A | | 6/2013 | |
| JP | 2014-229528 A | | 12/2014 | |
| JP | 2015-191872 A | | 11/2015 | |
| JP | 2017-162572 A | | 9/2017 | |
| WO | WO-2006000049 A1 | * | 1/2006 | B82Y 30/00 |
| WO | WO2010033121 A1 | | 3/2010 | |
| WO | WO2010093354 A1 | | 8/2010 | |

OTHER PUBLICATIONS

Yannick Garsany et al.: High-Activity, Durable Oxygen Reduction Electrocatalyst: Nanoscale Composite of Platinum-Tantalum Oxyphosphate on Vulcan Carbon Journal of Physical Chemistry Letters, US, vol. 1, No. 13, Jul. 1, 2010, pp. 1977-1981.

F. Rashchi and J. A. Finch, "Polyphosphates: A review Their Chemistry and Application with Particular Reference to Mineral Processing," Minerals Engineering, vol. 13, No. 10-11, 2000, pp. 1019-1035. http://dx.doi.org/0.1016/S0892-6875(00)00087-X.

* cited by examiner

FUEL CELL OR ELECTROLYSER

CROSS-REFERENCE TO RELATED APPLICATIONS

This application is the U.S. National Phase of PCT Appln. No. PCT/DE2019/101077 filed Dec. 19, 2019, which claims priority to DE 10 2019 133 872.7 filed Dec. 11, 2019 and to DE 10 2018 132 772.2 filed Dec. 19, 2018, the entire disclosures of which are incorporated by reference herein.

TECHNICAL FIELD

The present disclosure relates to a fuel cell or an electrolyser comprising at least one electrode and at least one polymer electrolyte membrane, the electrode comprising a catalyst system comprising a carrier metal oxide and a catalyst material.

BACKGROUND

Catalyst systems of the type mentioned at the outset are known, for example, from DE 10 2015 101 249 A1. As a result, metal oxides are used as carrier substances for active catalyst substances comprising at least one noble metal. The use of such a catalyst system for forming an electrode unit and its use for a fuel cell or an electrolyser is also described. The disadvantage of the catalyst system is the high proportion of noble metal that is required and thus increases the costs.

SUMMARY

Therefore, it is an object of the present disclosure to provide an alternative catalyst system comprising a carrier metal oxide and a catalyst material that can be produced cost-effectively and can be used in the area of an electrode of a fuel cell or an electrolyser.

A fuel cell or the electrolyser is provided, comprising at least one electrode and at least one polymer electrolyte membrane, the electrode comprising a catalyst system comprising a carrier metal oxide and a catalyst material, in that the catalyst material is formed by an electrically conductive metal phosphate in the form of a metaphosphate of the general chemical formula $Me^z_{n+2}(P_nO_{3n+1})_z$, where Me=metal,
z=valency of the metal Me, and
n is within the range of 1 to 10.

The catalyst system has the decisive advantage that the use of large amounts of expensive noble metals can be avoided. As a result, the catalyst system can be used less expensively and more extensively. In addition, it has a sufficiently high electrical conductivity, good long-term stability and reduced sensitivity to hydrolysis.

In particular, the electrically conductive metal phosphate has an electrical conductivity of at least 10 S/cm. This is achieved, for example, by doping the metal phosphate with doping elements.

Depending on the temperature and pH, the phosphates can condense to form annular metaphosphates and/or long-chain polyphosphates. For tantalum, for example, a composition of the formula $Ta_4(P_2O_7)_5$ would result for n=2.

For example, in some niobium and tantalum phosphates prepared from aqueous solution and subsequently annealed, $PO_4{-}$, $P_2O_7{-}$ and possible $P_3O_{10\text{-}5}{-}$ groups were identified in the different niobium and tantalum phosphates by infrared spectroscopy. If the phosphates are prepared for the respective area of application, it must be taken into account that the manufacturing conditions may differ from the application conditions. The molecules, which are usually tempered and condensed at higher temperatures, can, under the circumstances of use, hydrolyze to form smaller units of the formula $Me^z_{n+2}(P_nO_{3n+1})_z$.

A small amount of oxygen can also be incorporated, so that, for example, with tantalum phosphates, a small proportion of $TaOPO_4$ can result and be contained.

The degree of hydrolysis resistance of the catalyst material is also determined not least by the type of salt used, its solubility product, the free partial energies of formation and the valencies of the salt-forming cation. Formally, for example, the following reactions with tantalum phosphate as a catalyst material are conceivable:

$$5Ta(P_3O_{10}) + 2Ta_2O_5 = 3Ta_3(PO_4)_5 \quad (1)$$

$$3Ta(P_3O_{10}) + 6H_2O = Ta_3(PO_4)_5 + 4H_3PO_4 \quad (2)$$

Mesoporous tantalum phosphate, which can be made of a tantalum tartrate complex and ammonium dihydrogen phosphate by a precipitation reaction and subsequent calcination at about 550° C., proved to be extremely hydrolysis-stable. Therefore, the metal phosphate is in particular mesoporous.

Polyphosphates, like tantalum polyphosphates, are highly acidic and provide the protons in the catalysis reaction.

$$O_2 + (P_xO_y)4H_3O^+ + 4e^- = (P_xO_y)2H_2O + 4H_2O$$

In principle, the "acid-catalyzed" reaction via a proton donor is used for the present disclosure, as suggested by the chemical reaction equation for oxygen reduction.

The basic reaction is used as a basis for selecting the substance combinations: (Me stands for the metal-forming element in the oxide, e.g., platinum)

$$Me + \tfrac{1}{2}O_2 + H^+ + e^- \rightarrow Me\text{-}OH$$

$$Me + H_2O \rightarrow Me\text{-}OH^- + H^+ \quad (1)$$

$$(P_nO_{3n+1})^{(n+3)-} + H^+ \rightarrow (P_nO_{3n+1}H)^{(n+1)-} \quad (2)$$

$$Me\text{-}OH^- + (P_nO_{3n+1}H)^{(n+1)-} + e^- \rightarrow Me + (P_nO_{3n+1})^{(n+2)-} + H_2O \quad (3),$$

80 to 90 wt % of the carrier metal oxide and 10 to 20 wt % of the catalyst material are preferably used to form a catalyst system. A ratio of catalyst system to carrier metal oxide is particularly preferably 1:10.

The carrier metal oxide preferably contains at least one metal from the group comprising: tin, tantalum, niobium, titanium, zirconium, hafnium, aluminum.

In particular, the carrier metal oxide is further changed by doping with foreign atoms in such a way that the primary step of oxygen adsorption is facilitated.

It has proven effective if the catalyst system further comprises platinum. For doping the carrier metal oxide with one or more noble metals, in particular the elements iridium and/or ruthenium, concentrations up to x=0.05 (x=molar fraction) based on the metal content are preferred.

The carrier metal oxide has in particular oxide grains which have a grain size in the range of >50 nm.

The electrically conductive metal phosphate preferably contains at least one metal from the group comprising: tantalum, niobium, titanium, zirconium, hafnium. The particularly favorable properties of these metals are based, on the one hand, on their high acidity and, on the other hand, on their very low solubility products in water. The latter property results in good long-term stability. Metal phosphates are preferably used on the carrier metal oxide, in particular from electrically conductive metal oxide and/or modified metal oxide composites, which comprise the same metal as the carrier metal oxide. For example, combinations of tantalum phosphate and tantalum oxide/tin oxide or of niobium phosphate and niobium oxide/tin oxide, etc., have proven to be particularly useful. The metal phosphate preferably has a grain size in the range of <50 nm. The nanoscale design of the metal phosphate generates high densities of lattice disorder, which significantly increase the electrical conductivity of the metal phosphate.

It has proven to be advantageous if the carrier metal oxide and/or the metal phosphate is doped with iridium and/or ruthenium.

For doping the catalyst material or the metal phosphate with the elements iridium and/or ruthenium, concentrations of up to x=0.1 (x=molar fraction) based on the metal content are preferred. This is used in particular to adjust the electrical conductivity of the metal phosphate.

Furthermore, alternatively or additionally to doping the metal phosphate with iridium and/or ruthenium, further doping elements from the group comprising iron, tungsten, cobalt, nickel, molybdenum, vanadium, platinum, palladium can be used to adjust the electrical conductivity of the metal phosphate.

In particular, the carrier metal oxide has a first crystal lattice structure comprising first oxygen lattice sites and first metal lattice sites, wherein the carrier metal oxide on the first oxygen lattice sites is doped with at least one element from the group comprising: fluorine, nitrogen, carbon, and optionally additionally doped with hydrogen. The carrier metal oxide is preferably doped on the first metal lattice sites with at least one element from the group comprising iridium and ruthenium.

The catalyst material in particular has a second crystal lattice structure comprising second oxygen lattice sites and second metal lattice sites, wherein the catalyst material on the second oxygen lattice sites is doped with fluorine and at least one element from the group comprising: fluorine, nitrogen, carbon, boron, and optionally additionally doped with hydrogen. The catalyst material on the second metal lattice sites is preferably doped with at least one element from the group comprising iridium, ruthenium, iron, tungsten, cobalt, nickel, molybdenum, vanadium, platinum, palladium. Overall, this is also used in particular to adjust the electrical conductivity of the metal phosphate.

Furthermore, it has proven to be effective if the carrier metal oxide and the catalyst material are set with different surface energies, so that their wetting behavior with respect to water is different. It has proven to be advantageous if the catalyst material is more hydrophilic than the carrier metal oxide, in particular if the catalyst material is hydrophilic and the carrier metal oxide is hydrophobic. Alternatively, however, it is also possible for the catalyst material to be hydrophobic and the carrier metal oxide to be hydrophilic.

During the setting, care must be taken to ensure that the initial good properties for oxygen reduction do not deteriorate with the everyday use of the catalyst system in, for example, a fuel cell or an electrolyser. One measure of the hydrolysis behavior is, among other things, the pH value of the pzzp (point zero zeta potential). In this way, tantalum oxide with a pzzp at pH=1 is comparatively stable to hydrolysis. Due to its acidity, $Ta_2O_5$ has good catalytic properties, but at the same time having low electrical conductivity.

The properties are stabilized and adjusted by a combined process of fluorination and/or nitriding and/or carbonizing and/or boriding.

By fluorinating the surface, both the wetting properties and the flat band potentials are set, while the other doping elements adjust the conductivity and the surface energy states.

A special effect of nanoscale particles is that they can massively change their properties through "deficiency doping", whether by means of foreign atoms and/or through a high density of Frenkel and/or Mott-Schottky effects. Non-conductors become electrical conductors, or the particles have a high ionic conductivity or they adsorb specific atoms/molecules on the surface. The following principles are used as a basis for the setting:

- in the nanometer regime, surface and interface effects dominate the behavior of solids;
- with interface-controlled materials, the influence of the interface increases with decreasing grain diameter;
- positive excess charge leads to a reduction in hole and oxygen vacancies and thus to a reduction in ionic and electronic conduction;
- using mesoporous particles can transform electrical insulators into highly conductive materials; for example, $SiO_2$ is a strong adsorbent for negative charges, so that the $F^-$ conductivity in fluorides can be significantly increased in this way;
- in nanoparticles, the space charge effects for setting the properties of the solid dominate;
- the effects can be efficiently controlled by doping surface-active phases, here in particular to adjust the metal phosphate in contact with the nanoscale carrier metal oxide.

Platinum is preferably applied to a surface of the electrode in an amount of at most 0.1 mg/cm$^2$ (based on a projected electrode surface).

The polymer electrolyte membrane and an ionomer contained in the electrode are in particular formed from identical materials.

The following exemplary embodiments are intended to explain the present disclosure by way of example.

Example 1: Conductive Carrier Metal Oxide with Zirconium Phosphate (with Platinum Doping)

Tin dioxide with 0.9 at. % tantalum oxide $Ta_2O_5$ was produced as the carrier metal oxide. The adjustment of the concentration of $Ta_2O_5$ in the tin dioxide was due to the alpha solubility of the tantalum oxide in the tin oxide. The electrical conductivity of the carrier metal oxide was determined on a powder compact to be $6.5 \times 10^2$ Scm$^{-2}$. The particle size of the carrier metal oxide was between 75 and 100 nm.

The metal phosphate in the form of zirconium phosphate was first produced from zirconium tartrate by reaction with concentrated phosphoric acid. The precipitated salt was washed thoroughly, dried and calcined at 400° C. under nitrogen. The powder obtained was ground to a particle size of 10 to 20 nm by means of a high-energy mill.

The metal phosphate and the carrier metal oxide were thoroughly mixed in a ratio of 1:10 and then mixed in a ball mill at a low speed for better contacting. The powder obtained was vapor-deposited with platinum on a rotating substrate plate by means of a sputtering process. The platinum particles had a particle size in the range of 2 to 4 nm, the amount of platinum being about 0.1 mg $_{Pt}$/cm$^2$ with a layer thickness of 10 μm.

All tests were carried out, to ensure comparability, in accordance with the publication "Activity benchmarks and requirements for Pt, Pt-alloy and non-Pt oxygen reduction catalysts for PEMFCs", H A Gasteiger, S S Kocha, F T Wagner, B. Sompalli, Applied Catalysis B, Environmental, Vol. 56, Issues 1-2, pages 9-35, from 2005.

The catalyst systems were first qualified using RDE. For this purpose, a 1 μm thick, Nafion-bound layer was applied to glass carbon. The qualification took place as standard with revolutions of the RDE of 1600 rpm in 0.1 M $HClO_4$ at 60° C. The voltage cycle or a sweep rate was between 1300 mV and 300 mV compared to NHE is 20 mV/s.

The diffusion-determined limit current of the sample was 5.8 mA/cm². The limit current was reached at 710 mV compared to NHE. The onset voltage was 1010 mV compared to NHE and thus about 10% higher than in the comparison catalyst system platinum/VC (VC=Vulcan Carbon).

In a further arrangement, the catalyst system was tested on a 50 cm² Nafion film (Gore) with a single cell. For this purpose, the catalyst system was mixed with the ionomer (20 wt % Nafion solution (1000EW, Dupont)) and isopropanol and applied to a gas diffusion layer comprising an MPL (micro-porous layer) layer (SGL) in the CCS process.

The layer thickness was 10 μm±0.5 μm. Current densities of 1.2 A & 0.71 V were achieved under the standard cell conditions (T=85° C.). It was found that the specific data deteriorated with increasing exposure time, which was due to the hydrolysis sensitivity of the carrier metal oxide. The catalyst system already tended to agglomerate during the preparation of the dispersion when applied to the Nafion film.

Example 2: Conductive Fluorine-Treated Carrier Metal Oxide with Zirconium Phosphate (with Platinum Doping)

Here the carrier metal oxide was prepared as described for Example 1. The only difference was that the carrier metal oxide was treated with fluorine at 700° C. after production. Even after it was removed from the furnace, the carrier metal oxide had a much better flowability than before. All the following steps corresponded to those described in Example 1 above. The fluorination resulted in a slightly reduced electrical conductivity of the carrier metal oxide at a value of $3 \times 10^2$ S/cm².

The onset voltage for the acid reduction was 980 mV compared to NHE and 1.2 A & 0.69 V are achieved in the single cell. No significant change in the characteristic data was found after an exposure time of over 500 h and with repeated CV checks.

Example 3: Conductive Fluorine-Treated Carrier Metal Oxide with Tantalum Phosphate (with Platinum Doping)

The carrier metal oxide was produced according to Example 2. The metal phosphate in the form of tantalum phosphate was in turn produced from a tartrate complex with ammonium dihydrogen phosphate. The metal phosphate was calcined at T=550° C. under nitrogen. The specific surface area was 190 m² $g^{-1}$. Under exposure in a sulfuric acid solution at pH=3 and T=85° C., it was found that the tantalum phosphate was very stable. No leaching of phosphate, metaphosphate or tantalum was detected.

As already described above, the tantalum phosphate was intensively mixed with the carrier metal oxide in a ball mill. For better comparability, a mixing ratio of 1:10 was chosen as in Example 1.

The platinum was evenly applied to the powder by means of a sputtering process. Surprisingly good results were obtained with this catalyst system, with an onset voltage for oxygen reduction of 1100 mV compared to NHE and 1.2 A & 0.75 V in the single cell. The hydrolysis stability was again verified over 500 h without a noticeable decrease in the specific data.

In general, it should be noted that the temperature used to calcine the carrier metal oxide had a great influence on the result. Lower temperatures in the range of T<250° C. were tested in further experiments. A further improvement in the electrical conductivity of the carrier metal oxide could be demonstrated here.

It was found that the type of coating on the carrier metal oxide with metal phosphate and the mixing of carrier metal oxide and metal phosphate have a strong influence on the characteristics of the catalyst system. Using the doping, which is stated to be preferred, with fluorine and/or carbon and/or nitrogen, optionally also with hydrogen, the processing of the catalyst system is not only significantly easier. The catalyst system also has a much higher stability. Significant effects could be achieved if the acidic catalyst material was adjusted to grain sizes below 2 nm. Obviously, the "coherent" adsorption of the metal phosphate on the surface of the carrier metal oxide, which is possible in this way, sets a changed electronic structure with the influence of favorable field strength effects between the catalyst material and the carrier metal oxide.

Preparations without platinum have already shown promising results.

The following table shows measurement results for the following combinations of carrier metal oxides and catalyst materials:

TABLE

| Carrier metal oxide | Catalyst material | Ratio of catalyst material/ carrier metal oxide in wt % | I (A/cm²) & 0.7 V (T = 85° C.) | Onset voltage in mV vs. RHE |
|---|---|---|---|---|
| $Ta_{0.09}Sn_{1.91}O_2$ | $Zr_3(PO_4)_4$/ Pt 0.05 mg/cm² | 1:10 | 1.15 | 990 |
| $Ta_{0.09}Sn_{1.91}O_{1.99}F_{0.01}$ | $Zr_3(PO_4)_4$/ Pt 0.05 mg/cm² | 1:10 | 1.2 | 980 |
| $Ta_{0.09}Sn_{1.91}O_{1.99}F_{0.01}$ | $TaOPO_4$/ Pt 0.04 mg/cm² | 1:10 | 1.4 | 1100 |

BRIEF SUMMARY OF THE DRAWINGS

FIG. 1 shows a bipolar plate having an electrode containing the catalyst system;

FIG. 2 schematically shows a fuel cell system comprising a plurality of fuel cells;

FIG. 3 shows a section through the arrangement according to FIG. 1;

FIG. 4 shows a section through two bipolar plates and a polymer electrolyte membrane according to FIG. 2 arranged there between;

FIG. 5 shows a phase diagram of $Ta_2O_5$—$SnO_2$ above 1200° C.; and

FIG. 6 shows the calculated activities of $Ta_2O_5$ and $SnO_2$ at 1500° C.

DETAILED DESCRIPTION

Figure 1:
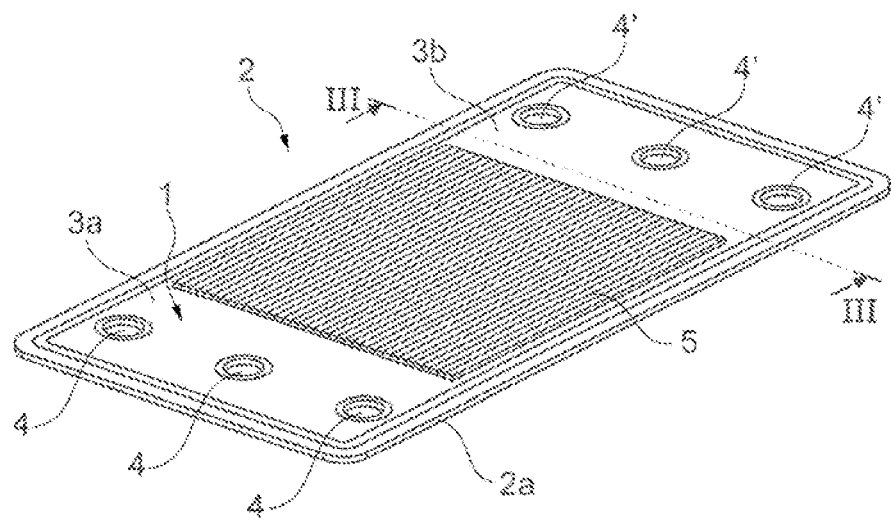
FIGS. 1 to 6 are intended to illustrate the present disclosure by way of example. In the figures.

FIG. 1 shows an electrode 1 on a bipolar plate 2 which has a carrier plate 2a. The electrode 1 contains the catalyst system 9 (see FIG. 3) and forms a cathode. The electrode 1 has a coating thickness in the range of 1 to 2 μm and, in addition to the catalyst system 9, also comprises an ionomer and a binding agent in the form of agar-agar. The bipolar plate 2 has an inflow area 3a with openings 4 and an outlet area 3b with further openings 4' which are used to supply a fuel cell with process gases and to remove reaction products from the fuel cell. The bipolar plate 2 also has a gas distribution structure 5 on each side, which is provided for contact with a polymer electrolyte membrane 7 (see FIG. 2).

Figure 2:
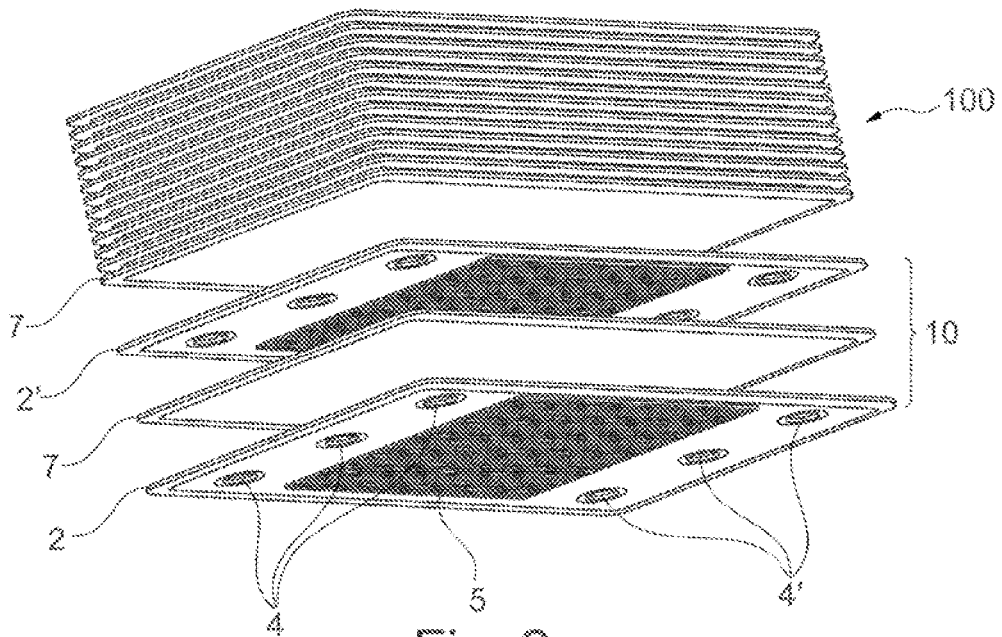

FIG. 2 schematically shows a fuel cell system 100 comprising a plurality of fuel cells 10. Each fuel cell 10 comprises a polymer electrolyte membrane 7 which is adjacent to both sides of bipolar plates 2, 2'. The same reference symbols as in FIG. 1 indicate identical elements.

Figure 3:
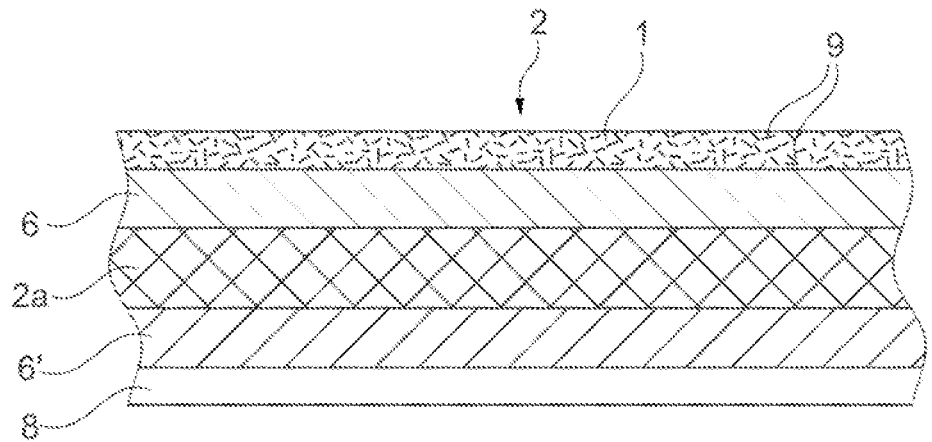

FIG. 3 shows a section through the electrochemical single cells 2 according to FIG. 1. The same reference symbols as in FIG. 1 indicate identical elements. The carrier plate 2a, which is formed here from stainless steel, can be seen, which can be constructed in one part or in several parts. A gas diffusion layer 6 is arranged between the carrier plate 2a and the electrode 1 which contains the catalyst system 9. It can also be seen that a further anode-side coating 8 of the carrier plate 2a is provided. This is preferably a coating 8 which is designed according to DE 10 2016 202 372 A1. A further gas diffusion coating 6' is located between the coating 8 and the carrier plate 2a. The gas diffusion layers 6, 6' are designed to be electrically conductive.

Figure 4:
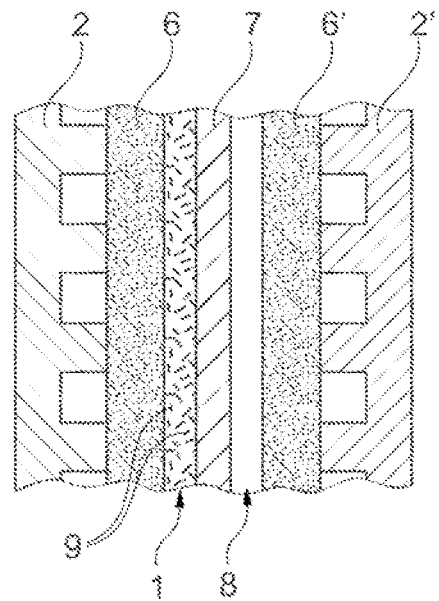

FIG. 4 shows a section through two bipolar plates 2, 2' and a polymer electrolyte membrane 7 according to FIG. 2 arranged therebetween, which together form a fuel cell 10. The same reference symbols as in FIGS. 1 and 3 indicate identical elements. It can be seen that the electrode 1 of the bipolar plate 2 as the cathode and the coating 8 of the bipolar plate 2' as the anode are arranged adjacent to the polymer electrolyte membrane 7. The gas diffusion layers 6, 6' can also be seen.

In the following, a catalyst system 9 is presented using the example of the quasi-binary oxide phase diagram $Ta_2O_5$—$SnO_2$ for the carrier metal oxide.

Figure 5:
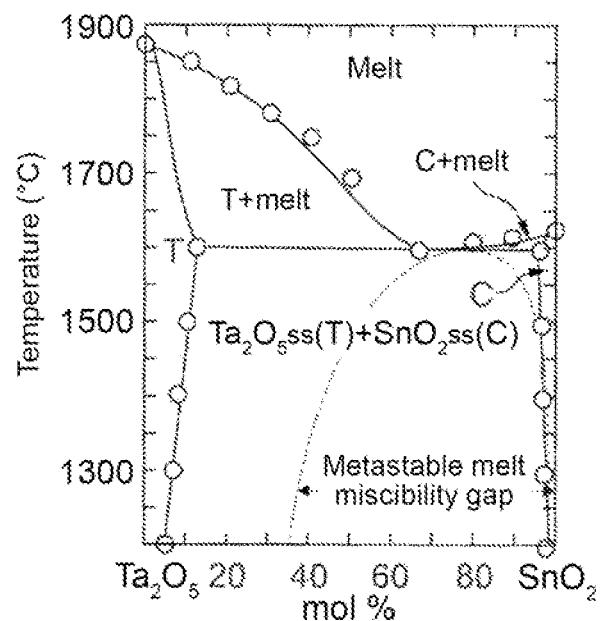

FIG. 5 shows a calculated phase diagram for the catalyst system $Ta_2O_5$—$SnO_2$ for temperatures above T=1200° C., which originates from the dissertation "The Impact of Metal Oxides on the Electrocatalytic Activity of Pt Catalysts" by A. Rabis, ETH Zurich 2015. The mutual solubilities at lower temperatures must be extrapolated and estimated. The phase diagram shows that tin oxide in tantalum oxide has an initial solubility of about 7 mol % at the temperature mentioned, while the initial solubility of tantalum oxide in tin oxide is 1.1 mol %. Accordingly, it can be assumed that the solubilities are lower at room temperature or at the operating temperature of a fuel cell.

Figure 6:
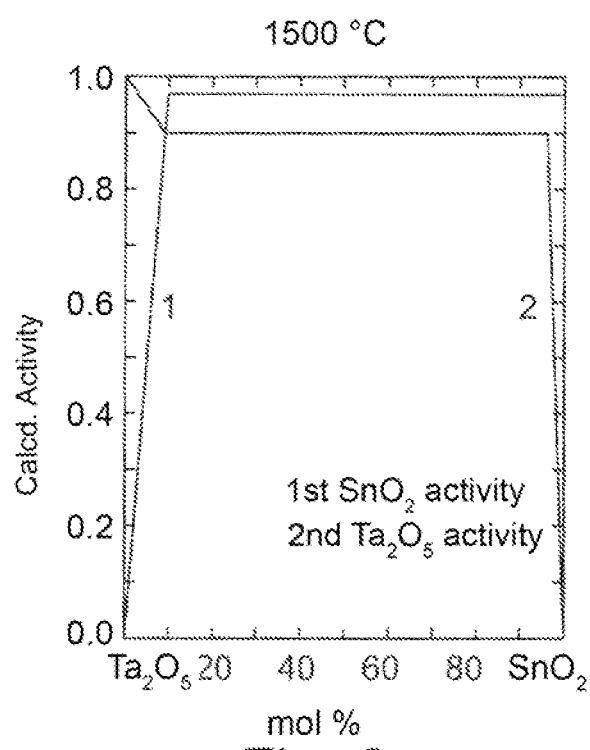

The activity profile of the two oxides at 1500° C. in the respective mixed phases is as shown in FIG. 6 (J. Am. Ceram. Soc., 95 [12], 4004-4007, (2012)). The stable thoreaulite phase $SnTa_2O_7$ is not included in this phase diagram according to FIG. 6. The tin is tetravalent in this composite. The electrical conductivity of the tin oxide is drastically increased with the solid solution of tin oxide with tantalum oxide. With an addition of tantalum oxide up to a maximum α-solubility of 1.1 mol % to tin oxide, electrical conductivities of $7 \times 10^2$ S/cm$^2$ are achieved.

The increase in electrical conductivity rises steadily with the concentration of the solution up to the aforementioned phase boundary and then decreases again. When the solubility limit according to the phase diagram shown in FIG. 6 is exceeded, a two-phase region is formed from the $SnO_2$—$Ta_2O_5$ phase and the thoreaulite $SnTa_2O_7$ in equilibrium. The composition of the heterogeneous structure can be calculated with given concentrations according to the lever rule. If, for example, a total concentration of 10 mol % $Ta_2O_5$ in $SnO_2$ is chosen, the result is a composition of the heterogeneous structure of 88% $Sn_{0.99}Ta_{0.01}O_2$ and 2% $SnTa_2O_7$ as oxide composite.

The conductivity of the tin oxide, in which the tantalum oxide is dissolved up to the maximum limit solubility (approx. 1.1 mol %), depends heavily on the sintering temperature. It is important to ensure that the oxygen partial pressure above the powder is always high enough that the fully oxidized composites are established. Otherwise, post-oxidation during cell operation and loss of electrochemical activity can be expected.

The carrier metal oxide was subjected to a nitrogen treatment and/or a carbon treatment (in particular with $C_2H_2$) and/or fluorinated with the aid of $CF_4$. Exceptionally good results were already achieved with the carrier metal oxides treated with carbon or nitrogen.

A tantalum phosphate was mixed with the carrier metal oxide as the metal phosphate.

Furthermore, the manner in which further deposition of nanodisperse platinum particles affects the electrocatalytic effectiveness of the catalyst system was investigated. The platinum was deposited on the surface of the catalyst system no. 4 according to Table 2 by means of sputtering technology with an area coverage of <0.1 mg/cm$^2$. In the case of this catalyst system with platinum, surprisingly high activities for oxygen reduction were found.

Overall, it can be stated that surprisingly high activities for oxygen reduction are found in the embodiments of the catalyst system according to the present disclosure both without platinum and with platinum.

Similar results were achieved with the same type of niobium-containing tin oxide composites. Niobium oxide has a slightly higher solubility in tin oxide than tantalum oxide. The limit solubility for niobium oxide is 2.5 at. %. With niobium oxide, stable stoichiometric phases $SnNb_2O_7$ ("froodite") similar to the thoreaulite phase are formed. The measured activities are lower than with the tantalum-based catalyst systems, which can be explained by, among other things, the different pzzp values set. However, it should be noted at this point that the activities depend very heavily on the manufacturing conditions.

The use of the catalyst system according to the present disclosure for future fuel cells or electrolysers brings with it considerable advantages, both economically and in terms of long-term stability and high catalytic activity.

LIST OF REFERENCE SYMBOLS

1 Electrode (cathode side)
2, 2' Bipolar plate
2a, 2a' Carrier plate
3a Inflow area
3b Outlet region
4, 4' Opening
5 Gas distribution structure
6, 6' Gas diffusion coating
7 Polymer electrolyte membrane
8 Coating (anode side)
9 Catalyst system
10 Fuel cell
100 Fuel cell system

What is claimed is:

1. A method of constructing a fuel cell or an electrolyser comprising:
   providing a cathode comprising a catalyst system comprising a carrier metal oxide and a catalyst material, the providing of the cathode including mixing the carrier metal oxide and the catalyst material together to form a powder mixture in which an electrically conductive metal phosphate is adsorbed as the catalyst material on a surface of the carrier metal oxide, and depositing the mixed carrier metal oxide and catalyst material on a carrier plate, the electrically conductive metal phosphate being in the form of a metaphosphate of the general chemical formula $Me^z_{n+2}(P_nO_{3n+1})_z$, where
   Me=a metal,
   z=a valency of the metal Me, and
   n is within a range of 1 to 10; and
   arranging a polymer electrolyte membrane adjacent to the cathode; and
   after the mixing of the carrier metal oxide and the catalyst material together to form the powder mixture, applying a dopant by means of a sputtering process to the powder mixture.

2. The method as recited in claim 1 wherein a ratio of the carrier metal oxide and the catalyst material mixed together includes 80 to 90 wt % of the carrier metal oxide and 10 to 20 wt % of the catalyst material.

3. The method as recited in claim 1, wherein the dopant is platinum.

* * * * *